United States Patent
Dubuis et al.

(10) Patent No.: US 6,422,855 B1
(45) Date of Patent: *Jul. 23, 2002

(54) DEVICE FOR TEMPERATURE ADJUSTMENT OF AN OBJECT

(75) Inventors: David Dubuis, Algrange (FR); Witold Neter, Newnan, GA (US)

(73) Assignee: Husky Injection Molding Systems, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/853,528

(22) Filed: May 11, 2001

Related U.S. Application Data

(63) Continuation-in-part of application No. 09/748,298, filed on Dec. 22, 2000.

(51) Int. Cl.[7] .......................... B29C 35/16; B29C 45/72; B29C 49/64

(52) U.S. Cl. .......................... 425/526; 264/237; 425/445; 425/547

(58) Field of Search ................................ 425/526, 547, 425/445; 264/237, 348

(56) References Cited

U.S. PATENT DOCUMENTS

| | | | | |
|---|---|---|---|---|
| 3,940,231 A | * | 2/1976 | Uhlig | 425/445 |
| 4,592,719 A | * | 6/1986 | Bellehache et al. | 425/526 |
| 4,786,455 A | * | 11/1988 | Krishnakumar et al. | 264/237 |
| 5,232,715 A | * | 8/1993 | Fukai | 425/526 |
| 5,641,451 A | * | 6/1997 | Orimoto et al. | 425/526 |
| 5,702,734 A | * | 12/1997 | Hartman et al. | 425/526 |
| 5,837,299 A | * | 11/1998 | Bright et al. | 425/547 |
| 6,171,541 B1 | * | 1/2001 | Neter et al. | 425/547 |
| 6,233,541 B1 | * | 5/2001 | Farrag | 425/526 |

FOREIGN PATENT DOCUMENTS

EP        0 700 770 A2  *  3/1996

* cited by examiner

*Primary Examiner*—Robert Davis
(74) *Attorney, Agent, or Firm*—Katten Muchin Zavis Rosenman

(57) ABSTRACT

A device for temperature adjustment of an object generally comprises means for providing a flow of a conditioning fluid, said flow of conditioning fluid being directed along a surface of said object, and at least one inner wall directed towards said surface of said object. The at least one inner wall is arranged in the immediate vicinity of said surface of said object so that an edge of said inner wall extends substantially normally with respect to said flow of said conditioning fluid, said conditioning fluid passing between said surface of said object and said edge of said inner wall.

18 Claims, 3 Drawing Sheets

DEVICE FOR TEMPERATURE ADJUSTMENT OF AN OBJECT

CROSS REFERENCE TO RELATED APPLICATIONS

This application is a continuation-in-part of patent application Ser. No. 09/748,298 filed Dec. 22, 2000, which is incorporated herein by reference.

INTRODUCTION

The present invention relates to a device and a method for temperature adjustment of an object, especially a device and a method for temperature adjustment of a molded object after removal from a mold cavity of an injection molding machine.

In order to improve the productivity of injection molding equipment, it has been known to reduce the cycle time for molding an object by removing the molded object from the mold cavity while it is still at high temperature. The molded object has thus to be cooled in a subsequent step in order to reduce the temperature of the molded object below its crystallization temperature range.

Two different approaches have been found for removing and subsequently cooling the molded objects.

In conventional molding machines, a carrying plate. with water-cooled tubes is positioned between the opened mold parts and the molded objects are transferred into the tubes of said carrying plate. The plate is then removed from between the mold parts so that the following molding cycle can start. During the next molding cycle the outer surface of the molded objects is cooled in the water-cooled tubes of the carrying. Such a device is disclosed in U.S. Pat. No. 4,729,732. In order to also cool the inner surface of hollow objects, a blowing nozzle can be introduced into the hollow object and a cooling fluid may be blown onto the inner surface of said hollow object.

Turret style injection machines comprise a rotatable turret block with a plurality of movable mold halves and a stationary mold half and platen. Each of the movable mold halves includes a set of mold cores adapted for engagement with a set of mold cavities located in stationary mold half and platen. After a set of objects has been formed on the mold cores of the first movable mold halve, the turret block rotates to a second position, in which the second movable mold halve is positioned for engagement with the stationary mold half. The set of objects remains on the mold cores of the first movable mold and is cooled by a cooling fluid, which is blown onto the exterior surface of the object. U.S. Pat. No. 4,449,913 discloses such a rotary injection turret for use in making preforms. The patent teaches a turret block rotatable on a vertical axis, which block uses two of the turret, block positions for post mold treatment of preforms while the preforms are still on mold cores. Accordingly, after injection, hold and some cooling at a first station, the turret block rotates to a second position where cooling fluid is blown onto the exterior surface of the preforms in order to cool the preforms. At a third position, the preforms are inserted into a conditioning mold from the turret block where the gate vestige is trimmed and further temperature conditioning is performed.

According to U.S. Pat. No. 4,449,913, the cooling of the performs at the second position is executed by means of a cooling unit comprising a plurality of nozzles for blowing a cooling gas onto the preforms. The nozzles are equal in number to the cores and are positioned in accordance with the arrangement of the cores so that, after alignment of the preforms with the nozzles, air is separately blown on each of the preforms. The nozzles are carried by a manifold to which there is connected a supply line. At the third station, a conditioning mold comprising a plurality of conditioning cavities receives the partially cooled preforms. Each conditioning cavity is oversized as compared to the preform so that conditioning gas (air) may be circulated along the preform.

An embodiment of a conditioning cavity is disclosed in U.S. Pat. No. 3,882,213. This conditioning cavity comprises a cooling tube for receiving a molded object that is to be cooled. The inner diameter of the cooling tube is larger than the outer diameter of the object, so that a flow passage having a generally annular section is formed between the cooling tube and the object. The inner walls of the cooling tube are provided with interior fluid directing fins in the form of an internal spiral for directing airflow in an axial and peripheral spiral path around the exterior of the object. It follows, that the flow path of a cooling fluid under pressure, which is introduced into the flow passage, will be substantially longer that in cooling tube with straight flow path. Accordingly, the heat exchange between the object and the cooling fluid in this conditioning cavity will be higher than in a cooling tube with smooth inner walls.

Although the cooling tube of U.S. Pat. No. 3,882,213 enhances the heat exchange between the object and the cooling fluid with respect to a smooth cooling tube, it is believed that the cooling rate of this device is still not sufficient. Furthermore, the manufacture of the fluid directing ribs in the form of an internal spiral is considered to be rather expensive.

OBJECT OF THE INVENTION

The primary object of the present invention is to provide an improved device and method for cooling a molded object.

A further object of the present invention is to provide an inexpensive post mold cooling device which exhibits increased cooling capacity.

GENERAL DESCRIPTION OF THE INVENTION

This object is generally achieved by a device for temperature adjustment of an object, comprising means for providing a flow of a conditioning fluid, said flow of conditioning fluid being directed along a surface of said object, and at least one fin directed towards said surface of said object. According to the invention said at least one fin is arranged in the immediate vicinity of said surface of said object so that an edge of said fin extends substantially normally with respect to said flow of said conditioning fluid, said conditioning fluid passing between said surface of said object and said edge of said fin.

Since the fin ends in the immediate vicinity of the surface of the object, the flow of conditioning fluid along the surface of the object is squeezed in the passage between the surface of the object and said fin. This means that the speed of flow increases in this region, so that the flow of conditioning fluid is highly turbulent in this region. It follows that the heat transfer between the conditioning fluid and the surface of the object in the region of the fin is very high.

After passing between the fin and the surface of the object, the conditioning fluid expands and accordingly the flow of conditioning fluid slows down again. This creates further turbulences, so that the heat transfer between the conditioning fluid and the surface of the object is also increased in a region adjacent to the fin.

With the present invention, the creation of a laminar flow of conditioning fluid along the surface of the object, i.e. a flow configuration with reduced heat exchange inside the flow and between different layers of the flow, is effectively prevented. Hence, the heat exchange between the surface of the object and the conditioning fluid is highly increased compared to prior art devices.

It has to be noted that the conditioning fluid can be either a cooling fluid, as e.g. compressed air, for cooling a warm object or a heat carrier for heating the object. The improved conditioning result is independent from the type of conditioning.

Depending on the embodiment of the invention, the at least one fin may be arranged substantially normal to said surface of said object or be inclined with respect to a normal of said surface of said object.

In a preferred embodiment of the invention, the fin ends in the vicinity of the surface of the object, so that a small gap is formed between the object and the edge of the fin. In this case the fin can be formed of an elastic or rigid material. In an alternative embodiment the edge of the fin abuts against said surface of said object if no conditioning fluid passes between said surface of said object and said edge of said fin. In this embodiment, the fin should be formed of an elastic material, so that the flow of conditioning fluid can displace the edge of the fin from the surface of the object. It follows that in this case, the gap between the edge of the fin and the surface of the object, necessary for passing the fluid, is only created by the fluid itself.

A preferred embodiment of a device for temperature adjustment of an object comprises means for providing a flow of a conditioning fluid, said flow of conditioning fluid being directed along a surface of said object, and a plurality of fins arranged one behind the other in the direction of said flow of said conditioning fluid, said fins being directed towards said surface of said object. In this embodiment, a plurality of narrow passages for the conditioning fluid are formed along the flow direction, each of said passages being delimited by one of the fins and the surface of the object. Furthermore, several turbulence chambers are formed between the fins. Accordingly, on its way along the surface, the conditioning fluid passes subsequently through the different delimited passages and turbulence chambers, thereby undergoing a plurality of alternate flow speed variations as described above. In this way, the improved cooling effect applies to a greater surface of the object.

The conditioning effect is improved in the zone corresponding to the high speed of the conditioning fluid. Thus, by increasing the number of fins and by placing the fins closer together, the conditioning effect can be increased so that the average conditioning effect is increased.

A further aspect of the present invention relates to a method for temperature adjustment of an object. This method comprises the steps of arranging at least one fin in the immediate vicinity of a surface of said object, said fin being directed towards said surface, providing a flow of a conditioning fluid along said surface of said object, said flow of conditioning fluid being directed substantially normally with respect of an edge of said fin, and passing said flow of conditioning fluid between said surface of said object and said edge of said fin. In a preferred embodiment of the method, the fins are arranged one behind the other in the direction of said flow of said conditioning fluid.

As stated above, the present invention relates also to a device for temperature adjustment of a molded object after removal from a mold cavity of an injection-molding machine. The principle of the invention can e.g. be used in the production of molded articles in a turret type molding machine, in which the molded objects remain on the mold cores of a mold half. For this application, a device for temperature adjustment of an object preferably comprises a conditioning hole and an associated means for providing a flow of a conditioning-fluid. The conditioning hole has a larger radial dimension than said object, so that the object can be introduced into said conditioning hole. The conditioning hole comprises at least one inner wall, said inner wall extending inwards from an inner surface of said conditioning hole, so that said inner wall extends towards an outer surface of an object introduced in said conditioning hole and ends in the immediate vicinity of said surface of said object.

In this embodiment, the inner wall of the conditioning hole acts as a fin for squeezing and accelerating the flow of conditioning fluid, e.g. a cooling fluid. For this reason, the inner wall is preferably a circumferential wall surrounding said outer surface of said object on the entire periphery. The inner wall may e.g. be formed by at least one elastic plate made preferably from rubber or other elastic material sandwiched between at least one rigid plate preferably made from metal or like material. Holes in the elastic plate align with holes in the rigid plates to create the conditioning hole for receipt of the molded article. A plurality of conditioning holes may be provided to receive a plurality of molded articles from the injection molding machine. The holes formed in the elastic plate are diametrically smaller than the holes formed in the rigid plate such that the periphery of the holes in the elastic plate are in close proximity to the surface of the article to be conditioned. In order to prevent damages on the object when said inner wall comes into contact with the object, the inner wall is preferably formed of an elastic material, as e.g. silicone, rubber, neoprene or SBR. In this case, a misalignment between the conditioning tube and the object during insertion of the object into the tube is not likely to result in any surface damage. This is especially important when multiple tubes are moved over multiple objects, when e.g. up to 96 objects on the respective mold cores are enclosed sinmultaneously by a like number of conditioning holes.

It has to be noted that the means for providing a flow of a conditioning fluid can be executed in various embodiments. In a first variant, this means comprises at least one conditioning fluid inlet associated with said conditioning hole for connecting said conditioning hole to a conditioning fluid supply and at least one conditioning fluid outlet, said inlet and said outlet being spaced in a longitudinal direction of said conditioning hole. The fluid inlet can e.g. be associated with a rearward end of the cooling hole wherein the fluid outlet is formed by the open forward end of the conditioning hole. Alternatively the fluid inlet can be associated with the forward end of said conditioning hole while the fluid outlet is arranged adjacent the rearward end.

In an alternative variant, said means for providing a flow of conditioning fluid comprises at least one suction means associated with said rearward end for aspirating air along said outer surface of said object. The suction means can e.g. comprise a vacuum pump connected to the rearward end of said conditioning hole By applying a vacuum at the rearward end of the hole, ambient air is aspirated through the open forward end of the tube, which passes along the surface of the object inserted into the conditioning hole. Furthermore, the vacuum applied at the rearward end of the hole aspires the objet, so that the object is held in the cooling hole while the air cools the part's surface. It follows that such a cooling device can also be used as a carrying device for an object which is ejected off the molding core.

The arrangement of several inner walls inside the cooling hole provides a further advantage over standard prior art conditioning tubes. In fact, the different fins extending towards the surface of the object provide the cooling hole with a sort of "gun silencer" design. This results in a significantly reduced noise in operation of the conditioning hole. Furthermore, the fins cause a high pressure drop between the fluid inlet and the outlet. This means that the consumption of conditioning fluid, e.g. compressed air, is considerably reduced.

The arrangement of the inner walls may be such that said inner walls are regularly spaced. In this case, the heat exchange between the conditioning fluid and the object will be similar in the different zones of the object. Alternatively, said inner walls are irregularly spaced, so that specific regions of the object may be subject to a higher exchange than others. For instance, the space between two fins can be reduced in a region where the object has a greater material thickness. The increased conditioning effect in this region can then result in a more constant temperature over the entire length of the object.

It will be apparent for the one skilled in the art, that the devices described above are suitable for use in different types of molding machines.

For instance in turret style injection machines, a conditioning mold arranged e.g. in a second or third position of the turret, can comprise a plurality of conditioning holes as described above for cooling the outer surface of the molded objects.

Conventional injection machines, in which a carrying plate with receiving cavities is positioned between the opened mold parts and the molded objects are transferred into the receiving cavities of said carrying plate, can comprise a conditioning device comprising a plurality of conditioning holes. These conditioning holes are then arranged on a support in accordance with the arrangement of the mold cores for inserting into a cavity of said objects. Furthermore, each receiving cavity may comprise a conditioning hole for cooling the outer surface of the object.

BRIEF DESCRIPTION OF THE DRAWINGS

The present invention will be more apparent from the following description of several not limiting embodiments with reference to the attached drawings, wherein.

DETAILED DESCRIPTION OF THE PREFERRED EMBODIMENTS

Figure 1:
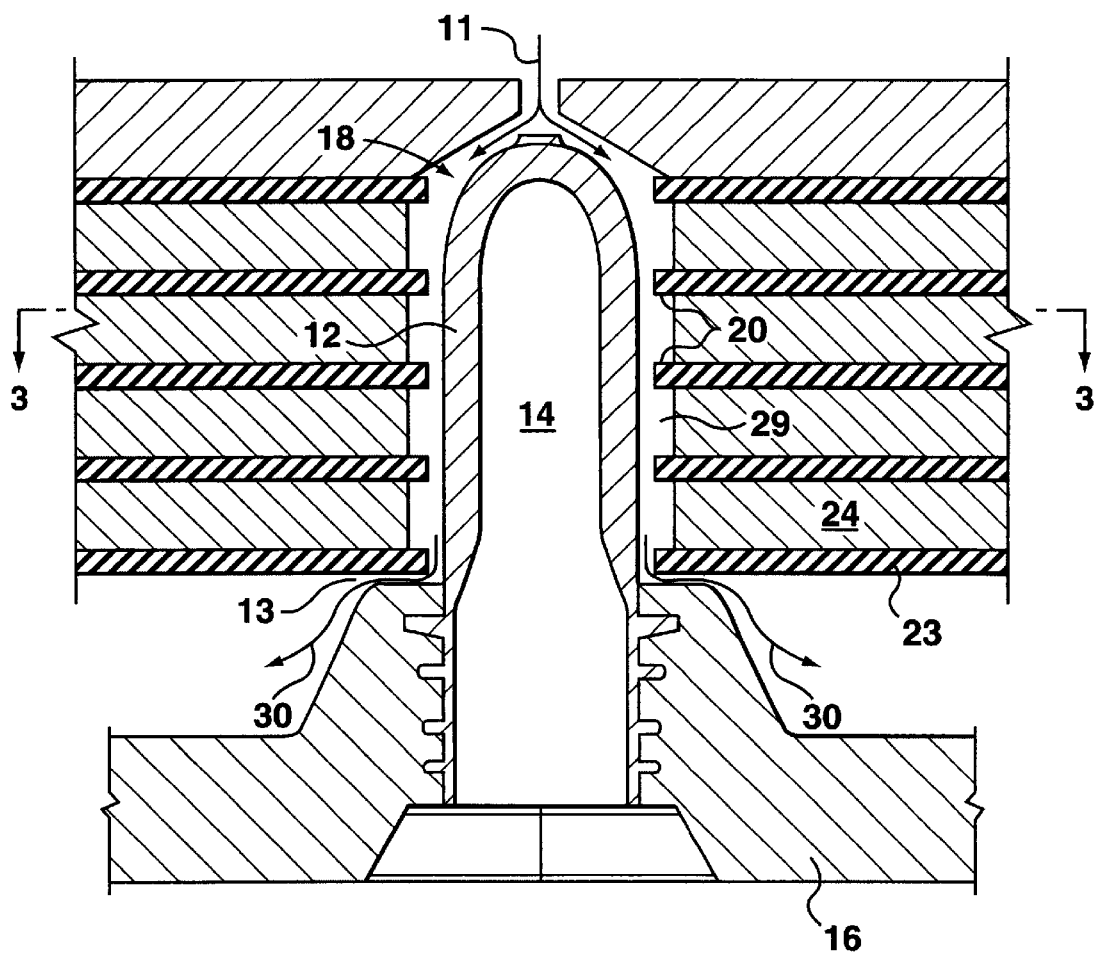
FIG. 1: shows an embodiment of a device for conditioning a preform on a mold core for use in a turret style molding machine.

FIG. 1 shows an embodiment of a device 10 for cooling an object, which is specifically adapted for cooling a molded object on a mold core. In an application on a turret style molding machine, a plurality of these devices are arranged in a conditioning mold, the number of the devices being equal to the number of the cores of the mold half and the positioning being in accordance with the arrangement of the cores.

The object shown in FIG. 1 is a preform 12 for blow molding a plastic bottle. During the molding process, the preform 12 is molded on one of the mold cores 14 of a first mold half 16, which is introduced in a mold cavity of a second mold half (not shown). After some cooling in the water-cooled second mold half, the first mold half is removed from the second mold half and rotated in a conditioning position of the turret. In this conditioning position, further cooling has to be performed in order to reduce the temperature of the preform to a value below its crystallization temperature. The preform is therefore introduced in a cooling device 10 for blowing a cooling fluid, e.g. compressed air, onto the outer surface of the preform.

The device 10 comprises at least one cooling hole 18, the inner dimension of which is a predetermined distance from the outer dimension of the preform 12. The cooling tube comprises at least one inner wall 20, which extend inwards from an inner surface of the tube 18. In the embodiment shown, the inner walls 20 extend radially inwards and end in the immediate vicinity of the outer surface of the object, so that a small gap is formed between the inner wall 20 and the surface of the preform.

The inner walls can e.g. comprise at least one sheet 23 of a flexible material, which are arranged in a stacked configuration, sandwiched between plates 24 made of a generally more rigid material e.g. aluminum or the like. This arrangement provides a very high flexibility with respect to the spacing of the inner walls 20. In fact, by using plates 24 of different heights, the distance between two inner walls 20 is easily adjustable.

Furthermore, the assembly of a plurality of cooling holes is very easy. Essentially the device is comprised of built up layers of a sheet 22 and plates 24, each having coaxially aligned holes. A through going bolt or similar fastener (not shown) can extend through each layer thereby rigidly affixing the entire assembly.

As shown in FIG. 1, a plate 25 is affixed adjacent the top distal end of preform 12. Plate 25 has an orifice 11 to allow the communication of the conditioning fluid through the conditioning hole 18. As shown by the arrows, and not by limitation, the conditioning fluid enters the conditioning hole 18 at an inlet 13, over each inner wall 20 and out orifice 11.

During operation, a conditioning fluid e.g. air, is supplied to the cooling hole 18 (indicated by arrow 30) which will flow along the surface of the preform. Due to the reduction of the area of the flow path in the region of the inner walls 20, the cooling fluid squeezes between t he inner walls 20 and the surface of the preform and accordingly it speeds up. After passing between the inner wall 20 and the surface of the preform, the cooling fluid enters a turbulence chamber 29 formed between two of the inner walls 20, where it expands and accordingly slows down. It follows that the flow of cooling fluid is highly turbulent along the surface of the preform, so that the heat exchange between the cooling fluid and the preform is substantially increased.

Figure 4:
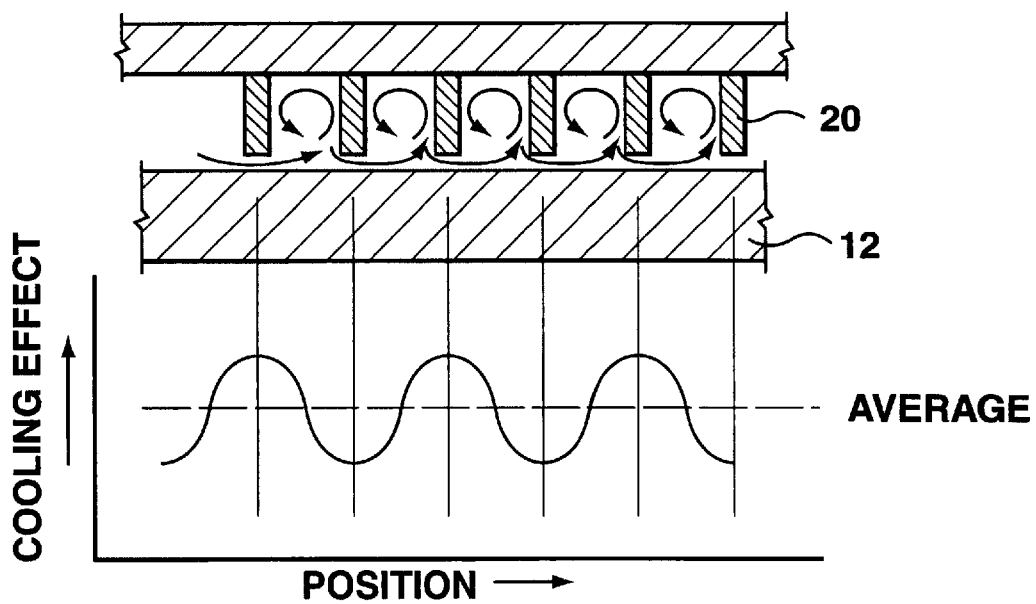
FIG. 4: shows the effect of the arrangement of fins on the cooling result.

By varying the number of inner walls 20 and adapting the space between two walls within certain limits, this heat exchange can be further increased so that the average cooling effect is increased. This principle is shown in FIG. 4. This figure shows the variation of the cooling effect over the length of the preform, i.e. a representation of the cooling effect vs. position on the preform.

Figure 2:
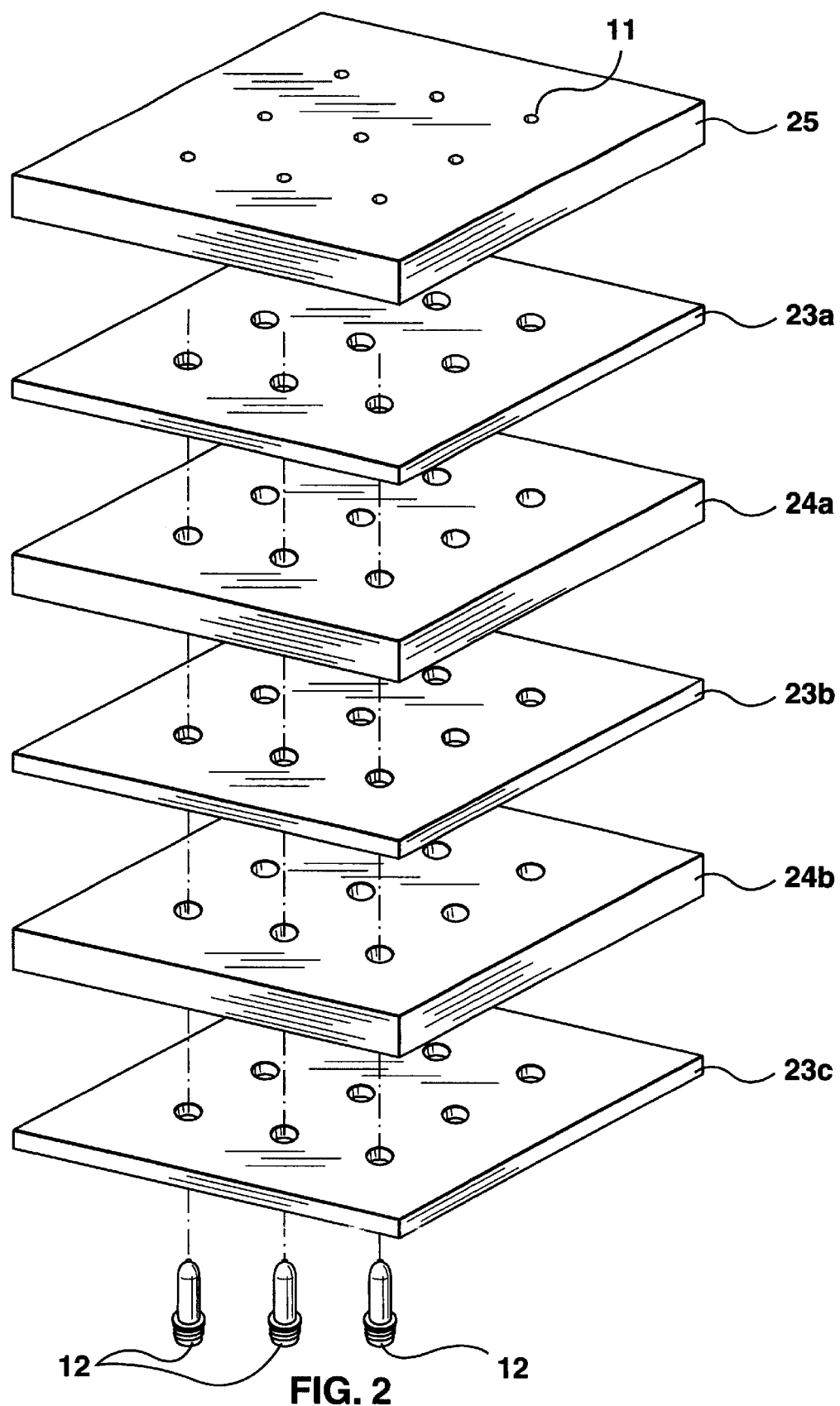
FIG. 2: shows an exploded view of the conditioning device in accordance with a preferred embodiment of the present invention.

An embodiment of a device for cooling a preform in a carrying plate on conventional molding machines is shown in FIG. 2. In this exploded view it is shown how the conditioning apparatus 10 is formed from a stacked array of conditioning holes formed when a plurality of sheets 23a–23c are sandwiched between a plurality of plates 24a–24b and 25. This device is suitable for cooling an array off preforms 12 that are received from a mold cavity.

Figure 3:
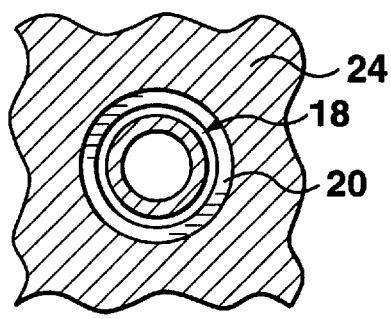
FIG. 3: shows a top view of the conditioning device.

FIG. 3 shows a top view of the conditioning device 10 showing the relative arrangement of an array of conditioning holes 18 which is formed by plate 24 and the inner walls 20. In a preferred embodiment, the inner walls 20 are formed in a sheet of flexible material e.g. rubber or the like.

What is claimed is:

1. Device for temperature adjustment of an object, comprising a conditioning hole and an associated means for providing a flow of a conditioning fluid, said conditioning hole having a larger radial dimension than said object, wherein said conditioning hole comprises at least one inner wall, said inner wall extending inwards from an inner surface of said conditioning hole, so that said inner wall extends towards an outer surface of an object introduced in said conditioning hole and ends in the immediate vicinity of said surface of said object.

2. Device according to claim 1, wherein said inner wall is a circumferential wall surrounding said outer surface of said object on the entire periphery.

3. Device according to claim 1, wherein said inner wall is formed by an appropriately sized orifice formed in a sheet of flexible material arranged inside said conditioning hole, said orifice having a predetermined diameter thereby forming a gap between said object and said orifice.

4. Device according to claim 1, wherein said inner wall is formed of an elastic material.

5. Device according to claim 1, wherein said means for providing a flow of conditioning fluid comprises at least one conditioning fluid inlet associated with said conditioning hole for connecting said conditioning hole to a conditioning fluid supply and at least one conditioning fluid outlet, said inlet and said outlet being spaced in a longitudinal direction of said conditioning hole.

6. Device according to claim 1, wherein said conditioning tube has an open forward end for receiving said object and a rearward end, and wherein said means for providing a flow of conditioning fluid comprises at least one suction means associated with said rearward end for aspirating air along said outer surface of said object.

7. Device according to claim 1, wherein said conditioning hole comprises a plurality of inner walls extending inwards from an inner surface of said conditioning hole, said inner walls being spaced in a direction of flow of a conditioning fluid, which flows between said conditioning fluid inlet and said conditioning fluid outlet.

8. Device according to claim 7, wherein said inner walls are regularly spaced.

9. Device according to claim 7, wherein said inner walls are irregularly spaced.

10. Device according to claim 7, wherein said inner walls are formed by at least one orifice formed in a sheet like material, said orifices being spaced apart by means of a plate.

11. Device according to claim 7, wherein said inner walls are formed of an elastic material.

12. Device according to claim 11, wherein said inner walls are formed of an elastic material and wherein said orifices have an inner diameter equal to or smaller than an outer diameter of said object.

13. Device according to claim 12, wherein each inner wall comprises at least one radial incision, said incision extending outwards from an inner border of said washer.

14. Device according to claim 1, wherein said conditioning fluid is a cooling fluid.

15. Device for temperature adjustment of an object, comprising a conditioning hole having an open forward end for receiving said object and a rearward end, and at least one suction means associated with said rearward end for aspirating air along an outer surface of an object inserted into said conditioning hole, said conditioning hole having a larger radial dimension than said object and comprising at least one inner wall, said inner wall extending inwards from an inner surface of said conditioning hole, so that said inner wall extends towards an outer surface of an object introduced in said conditioning hole and ends in the immediate vicinity of said surface of said object.

16. Injection molding machine, comprising a first mold half with a plurality of mold cavities, at least one second mold half with a plurality of mold cores, the number of said mold cores being equal or less than the number of said mold cavities and the arrangement of said mold cores being in accordance with the arrangement of said mold cavities, said second mold half being movable between a molding position, in which said mold cores are in alignment with said mold cavities for molding an object on each of said mold cores, and a conditioning position, in which objects formed on said mold cores are subject to a temperature conditioning, and a temperature conditioning mold arranged for receiving said objects molded on said mold cores when said second mold half is moved in its conditioning position, wherein said temperature conditioning mold comprises a plurality of devices for temperature adjustment of an object according to any one of claims 1 to 15.

17. Injection molding machine according to claim 16, wherein said objects are ejected from said mold cores when said objects are introduced into said temperature conditioning mold.

18. Injection molding machine according to claim 17, wherein said devices for temperature adjustment are arranged on a support in accordance with the arrangement of the mold cores for inserting said devices into a cavity of said objects.

* * * * *